United States Patent [19]

Ceccato et al.

[11] 4,062,830
[45] Dec. 13, 1977

[54] VULCANIZABLE COMPOSITIONS BASED ON ELASTOMERIC COPOLYMERS OF VINYLIDENE FLUORIDE, PROCESS FOR VULCANIZATION THEREOF UTILIZING PHOSPHOROUS METAL COORDINATION COMPLEX AND VULCANIZED COMPOSITIONS OBTAINED THEREBY

[75] Inventors: Giovanni Ceccato; Giovanni Moggi; Sergio Geri, all of Milan, Italy

[73] Assignee: Montedison S.p.A., Milan, Italy

[21] Appl. No.: 582,931

[22] Filed: June 2, 1975

[30] Foreign Application Priority Data

June 3, 1974  Italy ................................. 23505/74

[51] Int. Cl.$^2$ ...................... C08K 5/49; C08F 14/22; C08L 23/32
[52] U.S. Cl. ......................... 260/47 UP; 260/79.5 C; 526/18; 526/27
[58] Field of Search ............. 260/2 P, 47 UP, 33.8 F, 260/47 P, 79.5 A, 80 L, 87.7, 87.5 A, 42.27, 79.5 C; 526/27, 255, 18

[56] References Cited

U.S. PATENT DOCUMENTS

| 3,655,727 | 4/1972 | Patel et al. | 260/47 UP |
| 3,712,877 | 1/1973 | Patel et al. | 260/47 UP |
| 3,884,877 | 5/1975 | Kolb | 260/47 UP |
| 3,904,591 | 9/1975 | Fischer | 260/79.5 A |

FOREIGN PATENT DOCUMENTS 2,350,293  4/1974  Germany.

OTHER PUBLICATIONS

Rubber Chem. & Tech. - 1973 - pp. 619-652.

Primary Examiner—Joseph L. Schofer
Assistant Examiner—Peter F. Kulkosky
Attorney, Agent, or Firm—Hubbell, Cohen, Stiefel & Gross

[57] ABSTRACT

Vulcanizable compositions of vinylidene fluoride copolymer elastomers, a process for the vulcanization thereof, and vulcanizates produced thereby. The vulcanizable compositions comprise, in addition to the elastomeric fluoride copolymer, an inorganic acid acceptor, a basic compound, a polyhydroxy or polythiol vulcanizing agent, and a phosphorus complex compound additive. The presence of the phosphorus complex additive facilitates satisfactory vulcanization rates without scorching. The vulcanized fluorinated elastomers produced therefrom may be used as gaskets for sealing purposes and as protective layers in contact with corrosive chemical agents. They are particularly useful in applications such as sealing gaskets requiring strong adhesion to metallic surfaces even under severe temperature conditions.

6 Claims, No Drawings

VULCANIZABLE COMPOSITIONS BASED ON ELASTOMERIC COPOLYMERS OF VINYLIDENE FLUORIDE, PROCESS FOR VULCANIZATION THEREOF UTILIZING PHOSPHOROUS METAL COORDINATION COMPLEX AND VULCANIZED COMPOSITIONS OBTAINED THEREBY

BACKGROUND OF THE INVENTION

1. Field of the Invention

The present invention relates to vulcanizable compositions based on elastomeric copolymers of vinylidene fluoride, a process for vulcanizing such compositions and the vulcanized compositions obtained thereby.

2. The Prior Art

Vinylidene fluoride copolymers based on vulcanized elastomers are quite well known and are widely used in fields where exceptional chemical resistance to solvents, lubricants, fuels, acids and other like products is required, even at very high temperatures.

The vulcanized articles obtained from such heretofore known elastomeric copolymers are most suited for use in the field of sealing gaskets used under both static and dynamic conditions, in the motor-engineering field, in the aeronautical field, in shipbuilding, in the mechanical field, in the chemical field, in protective waterproofing of various supports, such as protective clothing against contact with aggressive chemical agents, sheaths for electrical cables exposed to heavy thermal radiation and, finally, as protective coatings on industrial containers and vessels.

According to the prior art, in the vulcanization of elastomeric vinylidene fluoride copolymers, there are used as vulcanizing agents, polynucleophilic compounds, and more particularly, polyhydroxy, aromatic compounds (or similar thiol-derivatives), as such and in the form of salts.

These known products yield vulcanized articles having satisfactory physical-mechanical characteristics and satisfactory thermal resistance.

Such products have, however, the disadvantage of requiring extremely long vulcanizing times, and thus, their practical utilization as vulcanizing agents is effectively prevented.

On the other hand, if, in order to reduce the vulcanization time, one attempts to increase the quantity of such vulcanized compounds, one would, of course, attain a higher vulcanization rate, but at the same time the characteristics of the final vulcanized products would be unacceptable; and thus, the practical utilization of the manufactured articles would again be effectively prevented. It is an object of the present invention to avoid the above disadvantages of the known products.

SUMMARY OF THE INVENTION

The present invention provides, in one aspect thereof, vulcanizable compositions based on elastomeric vinylidene fluoride copolymers, containing polynucleophilic compounds as vulcanizing agents, and which are free of the above-mentioned disadvantages.

In another aspect, the invention provides processes for vulcanizing such compositions.

In yet another aspect, the invention provides vulcanized compositions based on the elastomeric vinylidene fluoride copolymers of the invention.

According to the invention, the vulcanizable compositions consist essentially of:

1. 100 parts by weight of an elastomeric copolymer of (a) vinylidene fluoride, and (b) at least one fluorinated or chloro-fluorinated ethylenically unsaturated monomer such as 1-hydropentafluoropropene, 2-hydropentafluoropropene, 1,1-dihydrotetrafluoropropene, hexafluoropropene, tetrafluoroethylene, trifluorochloroethylene, or partially or totally fluorinated alkyl and aryl vinyl ethers;

2. 1–40 parts by weight of an inorganic acid acceptor consisting of at least one basic oxide of a bivalent metal such as magnesium oxide, calcium oxide, lead monoxide, zinc oxide and/or at least one basic lead phosphite as such or in the form of a complex or cationic chelate;

3. 0.5–10 parts by weight of at least one basic compound such as calcium, strontium or barium hydrate, alkali metal or alkaline earth metal salts of weak acids, such as calcium, strontium, barium, sodium and potassium carbonates, benzoates and phosphates, as such, or in the form of complexes with chelating agents or cationic complexants;

4. 0.5–15, preferably 1–6 parts by weight of a vulcanizing agent based on one or more polyhydroxy and/or polythiol compounds of the general formulae:

$$A(BC)_n \text{ and/or } CB-R-BC$$

wherein A is an arylenic radical; $n$ is a whole number equal to or greater than 2; B is oxygen and/or sulfur; C is hydrogen and/or an alkali metal or alkaline earth metal; R may be SO, $SO_2$, CO, S, O or an alkylene, cycloalkylene, mono- or polyalkylenecycloalkyl, alkylenediaryl, or oxoalkylenediaryl radical and, according to this invention;

5. 0.1–5 parts by weight of one or more phosphorus complexes having one of the following formulae:

$$a(MX)_m \cdot b[(R_1R_2R_3)P] \quad (I)$$

$$a(MX_m) \cdot b[(R_1R_2R_3)P] \cdot c(R_4Y) \quad (II)$$

wherein M is any element of the periodic system capable of forming coordination complexes with phosphorus and capable of yielding cations with a valence $m$ of from 1 to 4; $a$, $b$ and $c$ are whole numbers of from 1 to 4; $R_1$, $R_2$, $R_3$ and $R_4$ are the same or different and may each be hydrogen, alkyl, cycloalkyl, aralkyl, alkylaryl, aryl, oxyalkyl, or linear or cyclic polyoxyalkyl radicals with the hydroxyl group either free or etherified, and may be substituted by one or more halogens; $R_1$, $R_2$ and $R_3$ may, moreover, be alkoxyl, cycloalkoxyl, aryloxyl, or alkylenearyloxyl radicals; and $R_1$, $R_2$, $R_3$ and $R_4$ have from 1 to 18, and preferably from 6 to 12 carbon atoms; and X and Y are the same or different and may each be organic or inorganic monovalent anions such as halides, perchlorates, nitrates, acetates, haloacetates, preferably chloro- and fluoro-acetates, or benzoates, or the like.

The vulcanizable compositions of the invention are vulcanized by heating them under pressure and at temperatures of between about 130° C and 230° C., preferably between about 160° and 200° C, for a period of from about 0.5 to 60 minutes, preferably from about 1 to 20 minutes; and by thereafter post-vulcanizing the thus obtained articles under atmospheric pressure and at temperatures of between about 130° C and 315° C., preferably between about 200° and 275° C., for a period of from about 5 to 48 hours, preferably between about 10 and 24 hours.

It has, surprisingly, been found that the vulcanizable compositions of the invention may be transformed into manufactured articles of any shape or size by extrusion, preforming, and subsequent vulcanization, or by compression molding and simultaneous vulcanization, employing injection molding techniques. This latter feature is particularly important, since prior vulcanizable compositions containing, for example, quaternary phosphonium salts or phosphoranes, can not be subjected to injection molding without vulcanizing too rapidly and producing vulcanized bodies having poor hot tear resistance.

Such manufactured articles display good compression set values, show a very low tendency to scorching or pre-curing in relationship to storing time and temperature or to the temperatures of particular processing technologies, e.g., during extrusion, and also display a high resistance to thermal aging. These articles can, moreover, be adhered to metal supports or alloys thereof, with respect to which they show exceptional adhesion, even at high temperatures, e.g., at 250° C. and higher temperatures.

It has also been found that the vulcanizable compositions of the present invention neither stain nor foul molds, thereby practically eliminating production waste and facilitating high production standards and regular processing cycles.

PREFERRED EMBODIMENTS OF THE INVENTION

Preferred vinylidene fluoride polymers useful as the elastomeric copolymer constituent [ingredient (1) above] of the vulcanizable compositions hereof comprise copolymers of from about 30 to 70 mole % of vinylidene fluoride, and from about 70 to 30 mole % of 1-hydropentafluoropropene and/or hexafluoropropene; or terpolymers of from about 40 to 80 mole % of vinylidene fluoride from about 30 to 10 mole % of tetrafluoroethylene and from 30 to 10 mole % of 1-hydropentafluoropropene and/or hexafluoropropene. It will, however, be understood that the present invention is applicable to the vulcanization of other elastomeric fluorinated polymers, substituted fluorinated elastomers, and to mixtures of fluorinated elastomers as well.

Preferred polyhydroxy and polythiol compounds useful as vulcanizing agents [ingredients (4) above] in accordance with the invention include: hydroquinone, resorcinol, catechol, naphthols, polyhydroxybenzophenones, bis-hydroxyaryl sulfones, bisphenols and their derivatives substituted in the aromatic ring and/or in the aliphatic group (R = alkylenediarylenic) by, for example, halogens such as chlorine and fluorine; and the corresponding thiols, both as such or in the form of mono-, di-, or polysalts of alkali metals or alkaline earth metals; lower aliphatic and cycloaliphatic diols such as 1,4-butanediol, dialkylenecycloaliphatic diols such as 1,4(dihydroxymethyl) cyclohexane and dialkylenearomatic diols such as 1,4(dihydroxymethyl)benzene; and the corresponding thiols, both as such or in the form of mono-, di-, and polysalts of alkali metals or alkaline earth metals.

Preferred phosphorus complexes useful as ingredient (5) of the vulcanizable compositions hereof include those complexes in which:

M is a cation of a metal, e.g., Fe, Co, Ni, Pd, Hg, Cu, Zn, Cd or the like, or a cation such as [TiO]++ or [VO]++ or the like;

a is preferably 1, b is preferably 2 or 4 and c is preferably 1 or 2;

X and Y are the same or different and may each be halides such as Cl⁻, Br⁻, I⁻, perchlorate (ClO$_4$⁻), a (CdI$_4$) −− group, chloroacetate (ClCh$_2$—COO⁻) or the like;

R$_1$, R$_2$ and R$_3$ are each the same and are phenyl groups, possibly halogen substituted, p-trifluoromethylphenyl groups

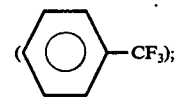

or R$_1$ and R$_2$ are the same and are phenyl groups or lower alkyl radicals, and R$_3$ is a polyoxyalkylene group, a —CF$_3$ group or a phenyl group; and R$_4$ is an alkyl radical such as —C$_4$H$_9$, or an aralkyl radical such as benzyl and, R$_1$, R$_2$ and R$_3$ are the same and are preferably each phenyl groups.

Examples of complexes of phosphorus, particularly suitable for use in the vulcanizable compositions of this invention, are as follows:

1. Monochlorobis(triphenylphosphine)copper (I) CuCl . 2P(C$_6$H$_5$)$_3$;
2. dichlorobis(triphenylphosphine copper (II) CuCl$_2$ . 2P(C$_6$H$_5$)$_3$;
3. dichlorobis(triphenylphosphine)nickel (II), NiCl$_2$ . 2P (C$_6$H$_5$)$_3$;
4. dichlorobis(tri-p.chlorophenylphosphine)nickel (II), NiCl$_2$ . 2P (C$_6$H$_4$Cl)$_3$;
5. dibromo-bis(ethoxy-diphenylphosphine)nickel (II), NiBr$_2$ . 2P[(C$_6$H$_5$)$_2$OC$_2$H$_5$];
6. dichlorobis(tris[trifluoro-paratolyl-phosphine])nickel

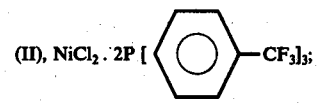

7. dichlorobis(methoxyethoxy-diphenylphosphine)nickel (II), NiCl$_2$ . 2[P(C$_6$H$_5$)$_2$.OCH$_2$—CH$_2$—O-CH$_3$];
8. di(monochloroacetate)bis(triphenylphosphine)nickel (II), Ni[ClCH$_2$COO]$_2$ . 2P (C$_6$H$_5$)$_3$;
9. dichlorobis(dimethyltrifluoromethylphosphine)nickel (II), NiCl$_2$ . 2[P(CH$_3$)$_2$CF];
10. dichlorobis(triphenylphosphine)cobalt (II), CoCl$_2$ . 2P(C$_6$H$_5$)$_3$;
11. diiodobis(triphenylphosphine)cobalt (II), CoI$_2$ . 2P(C$_6$H$_5$)$_3$;
12. dibromobis(triphenylphosphine)cobalt (II), CoBr$_2$ . 2P(C$_6$H$_5$)$_3$;
13. diperchlorate-bis(triphenylphosphine)cobalt (II), Co(ClO$_4$)$_2$ . 2P(C$_6$H$_5$)$_3$;
14. dichlorobis(diethylphenylphosphine)cobalt (II), CoCl$_2$ . 2[P(C$_2$H$_5$)$_2$(C$_6$H$_5$)];
15. dichlorobis(triphenylphosphine)iron (II), FeCl$_2$ . 2P(C$_6$H$_5$)$_3$;
16. diiodobis(triphenylphosphine)iron (II), FeI$_2$ . 2P(C$_6$H$_5$)$_3$;
17. dibromobis(triphenylphosphine) (II), FeBr$_2$ . 2P(C$_6$H$_5$)$_3$;
18. tetraiodocadmiate of tetrakis(triphenylphosphine)iron (II), [CdI$_4$] . [Fe(P(C$_6$H$_5$)$_3$)$_4$];
19. dibromobis(triphenylphosphine)zinc (II), ZnBr$_2$ . 2P(C$_6$H$_5$)$_3$;

20. dichlorobis(triphenylphosphine)zinc (II), ZnCl$_2$ . 2P(C$_6$H$_5$)$_3$;

21. dichlorobis(triphenylphosphine)mercury (II), HgCl$_2$ . 2P(C$_6$H$_5$)$_3$;

22. dichlorooxobis(triphenylphosphine)vanadium (IV), VOCl$_2$ . 2P(C$_6$H$_5$)$_3$;

23. dichlorobis(triphenylphosphine)palladium (II), PdCl$_2$ . 2P(C$_6$H$_5$)$_3$;

24.

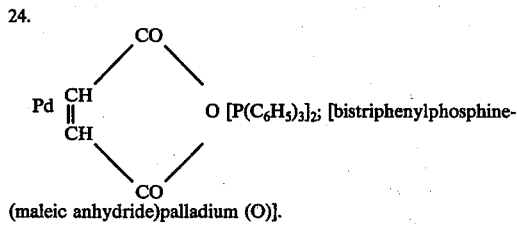

(maleic anhydride)palladium (O)].

Additional complexes of the type of Formula (II) above which may be utilized as ingredient (5) of the vulcanizable composition hereof including the following:

| | | | |
|---|---|---|---|
| 25. | [NiBr$_2$ . 2P(C$_6$H$_5$)$_3$] . (C$_4$H$_9$Br) | M.P. 178° C. |
| 26. | [NiCl$_2$ . 2P(C$_6$H$_5$)$_3$] . (C$_6$H$_5$CH$_2$Br) | M.P. 184° C. |
| 27. | [NiBr$_2$ . 2P(C$_6$H$_5$)$_3$] . (C$_2$H$_5$I) | M.P. 160° C. |
| 28. | [NiBr$_2$ . 2P(C$_6$H$_5$)$_3$] . (C$_6$H$_5$Br) | M.P. 210° C. |
| 29. | [NiCl$_2$ . 2P(C$_6$H$_5$)$_3$] . (C$_6$H$_5$CH$_2$Cl) | M.P. 217° C. |
| 30. | [NiCl$_2$ . 2P(C$_6$H$_5$)$_3$] . (CH$_3$OCOCH$_2$Cl) | M.P. 226° C. |
| 31. | [NiBr$_2$ . 2P(C$_6$H$_5$)$_3$] . 2[(C$_6$H$_5$Br) ] | M.P. 270° C. |
| 32. | [NiCl$_2$ . 2P(C$_6$H$_5$)$_3$] . (C$_4$H$_9$Br) | M.P. 171° C. |
| 33. | [CoCl$_2$ . 2P(C$_6$H$_5$)$_3$] . (C$_6$H$_5$CH$_2$Cl) | M.P. 217° C. |
| 34. | [CoCl$_2$ . 2P(C$_6$H$_5$)$_3$] . (C$_{16}$H$_{33}$Br) | M.P. 105° C. |
| 35 | [CoCl$_2$ . 2P(C$_6$H$_5$)$_3$] . (C$_{16}$H$_{33}$Br) . (C$_6$H$_5$CH$_2$Br) | M.P. 196° C. |
| 36. | [CoCl$_2$ . 2P(C$_6$H$_5$)$_3$] . 2(C$_6$H$_5$CH$_2$Cl$_2$) | M.P. 226° C. |
| 37. | [CoCl$_2$ . 2P(C$_6$H$_5$)$_3$] . (C$_4$H$_9$Br) | M.P. 182° C. |
| 38. | [CoCl$_2$ . 2P(C$_6$H$_5$)$_3$] . (C$_4$H$_9$I) | M.P. 166° C. |
| 39. | [HgCl$_2$ . 2P(C$_6$H$_5$)$_3$] . (C$_6$H$_5$CH$_2$Cl) | M.P. 246° C. |
| 40. | [CuCl$_2$ . 2P(C$_6$H$_5$)$_3$] . (C$_6$H$_5$CH$_2$Cl) | M.P. 239° C. |
| 41. | [ZnCl$_2$ . 2P(C$_6$H$_5$)$_3$] . (C$_6$H$_5$CH$_2$Cl) | M.P. 198° C. |
| 42. | [ZnCl$_2$ . 2P(C$_6$H$_5$)$_3$] . 2(C$_6$H$_5$CH$_2$Cl) | M.P. 221° C. |
| 43. | [ZnCl$_2$ . 2P(C$_6$H$_5$)$_3$] . (C$_4$H$_9$I) | M.P. 154° C. |
| 44. | [CdCl$_2$ . 2P(C$_6$H$_5$)$_3$] . (C$_4$H$_9$I) | M.P. 162° C. |
| 45. | [CdCl$_2$ . 2P(C$_6$H$_5$)$_3$] . (C$_6$H$_5$CH$_2$Cl) | M.P. 199° C. |
| 46. | [CdCl$_2$ . 2P(C$_6$H$_5$)$_3$] . 2(C$_6$H$_5$CH$_2$Cl) | M.P. 205° C. |
| 47. | [CdCl$_2$ . 2P(C$_6$H$_5$)$_3$] . 2(C$_4$H$_9$I) | M.P. 128° C. |

*The melting points of complexes 25-47 above were determined by means of a DSC (differential scanning colorimeter).

The above-identified phosphorus complexes may be prepared by syntheses known in the art, e.g., complexes 25-47 may be readily prepared by the method described by K. Yamamoto in Bull. Chem. Soc. Japan, 27, pp. 501-515 (1954).

The quantity of the phosphorus complex incorporated in the vulcanizable compositions of the invention, while within the proportions specified hereinabove, nevertheless depends on the solubility of the phosphorus complex additive in the fluorinated elastomer, on the presence or absence of the steric hindrance in the additive itself, on the degree of alkalinity of the vulcanizable composition, and on many other factors associated with the particular additives used, the type, shape and sizes of the manufactured article to be prepared, the vulcanization conditions, and the system and heating conditions employed during vulcanization.

The vulcanizable compositions according to this invention may contain, in addition to ingredients (1)-(5) above, carbon black, white and colored fillers, plasticizers and lubricants, e.g., stearates, arylphosphates, polyethers, polyesters, polyethylene and other known additives commonly utilized in the field of fluorinated elastomers.

The several ingredients of the vulcanizable compositions hereof are readily incorporated into the elastomeric vinylidene fluoride copolymers either separately or in pre-mixed form, or they may be dissolved and subsequently adsorbed on inert high surface area materials, without any undesirable secondary phenomena such as superficial blooming caused by migration within the vulcanizable composition.

Employing the above-identified vulcanizable compositions, and by virtue of the excellent heat stability of the phosphorus complexes incorporated therein, it is possible to obtain satisfactory vulcanization rates at operational temperatures without, however, incurring any danger of scorching (pre-vulcanization) in the preliminary processing stages preceding actual vulcanization. A further advantage attendant the use of such compositions is the complete elimination of the undesirable "background" phenomenon which frequently accompanies vulcanization of fluorinated elastomeric articles, e.g., O-ring gaskets, under pressure in closed molds.

In a particularly preferred embodiment of the vulcanizing process of the invention, a mixture of the phosphorus complex (0.1-2 parts by weight) and vulcanizing agent (1-6 parts by weight) is added to the fluorinated elastomer (100 parts by weight), before the addition of the acid acceptor (2-10 parts by weight), the basic compound (1-7 parts by weight), and any reinforcing and inert fillers, lubricants, plasticizers or other additive incorporated therein.

Operating in this way a fast, controlled and uniform vulcanization canization may be effected without any danger of the appearance of undesirable phenomena, e.g, scorching, during the various processing steps or during storage of the vulcanized compositions.

Similarily, any danger of loss of the vulcanizable composition through volatilization during its preparation or storage is avoided, and no special precautions by the personnel in charge of processing are required.

The vulcanized fluorinated elastomers obtained in accordance with this invention may be used as gaskets for sealing purposes, both for static and dynamic seals in motors or in other mechanical applications; and as protective layers in contact with corrosive chemical agents, e.g., as sheaths for the protection of electrical cables when exposed to intensive thermal radiation; and in other similar applications.

The following examples are given for illustrative purposes only, and should not be contrued as limiting the scope of the present invention.

EXAMPLE 1-6

Following the method described in German Patent No. 836,647, the following phosphorus complexes C$_1$ and C$_2$ are prepared:

C$_1$: CuCl . 2P(C$_6$H$_5$)$_3$
[monochlorobis(triphenylphosphine)copper (I)]
C$_2$: CuCl$_2$ . 2P(C$_6$H$_5$)$_3$
[dichlorobis(triphenylphosphine)copper (II)]

The complexes are used as components of vulcanizable compositions of an elastomeric copolymer of vinylidene fluoride, together with bisphenols or their alkaline monosalts as vulcanizing agents. For this purpose blends of 100 parts by weight of a fluorinated elastomer of the type commercially known as Tecnoflon SL (the trade name of MONTEDISON S.p.A.), an elastomeric copolymer of vinylidene fluoride with 1-hydropentafluoropropene in a molar ratio of 4:1, having a Mooney viscosity ML (1+4) at 100° C. = 75, and a specific weight at 25° C. = 1.816 g./cm.$^3$, 5 parts by weight of magnesium oxide with a high surface activity, 30 parts by weight of carbon black MT and 8 parts by weight of Ca(OH)$_2$ are prepared.

The indicated phosphorus complexes are initially adsorbed on 60% by weight calcium silicate, then admixed with the vulcanizing agent, and thereafter incorporated into the raw elastomer in a water-cooled cylinder mixer, before adding the other components of the blend. In this manner 6 blends are prepared and subsequently subjected to vulcanization for 12 minutes at 185° C. under pressure. The vulcanized materials are then subjected to a post-vulcanization cure in an oven through which air is circulated at 250° C. for 20 hrs., with the temperature gradually being increased from 100° C. to 250° C. over 5 hrs.

Table A summarizes the data relating to the qualitative and quantitative compositions of six different blends formed as described hereinabove, and the characteristics of the vulcanized bodies obtained therefrom:

EXAMPLES 7-11

Proceeding according to the method described by F. A. Cotton et al., in J.Am.Chem.Soc. 83, 1781, the following phosphorus complex C$_3$ is prepared:

C$_3$: CoCl$_2$.2P(C$_6$H$_5$)$_3$
[dichlorobis(triphenylphosphine)cobalt (II)].

This complex is used as a component of vulcanizable compositions of elastomeric copolymers of vinylidene fluoride, wherein aromatic polyhydroxy compounds such as hydroquinione, bisphenol AF, 2,4-dihydroxybenzophenone or thier alkaline mono-salts are used as vulcanizing agents.

Blends so useful as qualitatively and quantitatively similar to those described in Examples 1-6, the principal differences residing in the type of elastomeric copolymer utilized and more particularly in the use of Tecnoflon NM (trade mark of MONTEDISON S.p.A.), an elastomeric copolymer of vinylidene fluoride with hexafluoropropene in a molar ratio of 4:1, having a Mooney ML (1+4) viscosity at 100° C. = 100, and a specific weight at 25° C. = 1.781 g./cu.cm.; and in the quantities of magnesium oxide of Ca(OH)$_2$ incorporated

TABLE A

| Vulcanization of Vinylidene Fluoride-1-Hydropentafluoropropene Elastomer With Copper-Phosphorus Complexes | | | | | | |
|---|---|---|---|---|---|---|
| | Examples | | | | | |
| Components of the blend (parts by weight) | 1 | 2 | 3 | 4 | 5 | 6 |
| Tecnoflon SL | 100 | 100 | 100 | 100 | 100 | 100 |
| MgO (Maglite D) | 5 | 5 | 5 | 5 | 5 | 5 |
| Carbon black MT | 30 | 30 | 30 | 30 | 30 | 30 |
| Ca(OH)$_2$ | 8 | 8 | 8 | 8 | 8 | 8 |
| Bisphenol AF (hexafluoro-isopropyliden-bis-(4-hydroxybenzene) | 2.5 | — | 2 | — | 2.2 | — |
| Mono K-bisphenol AF (mono potassium salt of above compound) | — | 1.8 | — | 1.7 | — | 1.9 |
| Complex C$_1$ | — | — | 1.5 | 1 | — | — |
| Complex C$_2$ | — | — | — | — | 1.5 | 1.2 |
| Properties of Vulcanizate | | | | | | |
| Viscosity: | | | | | | |
| Mooney MS, at 121° C. $^{(1)}$ | | | | | | |
| minimum | 30 | 28 | 33 | 31 | 27 | 34 |
| minutes for 10 points | | | | | | |
| increase | () | () | 41 | 36 | 40 | 32 |
| Modulus at 100% elongaton, kg./sq.cm. $^{(2)}$ | (*) | (*) | 38 | 55 | 25 | 48 |
| Tensile strength, kg./sq.cm. $^{(2)}$ | — | — | 160 | 180 | 150 | 165 |
| Elongation at break, % $^{(2)}$ | — | — | 260 | 215 | 285 | 220 |
| Hardness, IRHD $^{(3)}$ | — | — | 67 | 69 | 67 | 70 |
| Compression set, O-Rings ($\phi$ 25.4 mm. × 3.53 mm.) | | | | | | |
| 200° C. for 70 hours $^{(4)}$ | — | — | 24 | 20 | 29 | 26 |
| 200° C. for 168 hours | — | — | 35 | 31 | 41 | 39 |
| Thermal Resistance: | | | | | | |
| 275° C. × 70 hours | | | | | | |
| Variation of modulus, % | — | — | −10 | −9 | −3 | 0 |
| Variation of tensile strength, % | — | — | −23 | −20 | −30 | −31 |
| Variation of elongation at break, % | — | — | +10 | +15 | +2 | +8 |
| Hardness, variation of points | — | — | 0 | −1 | 0 | +2 |

(*) Bubbled and unvulcanized test pieces.
(**) Two points after 55 minutes.
$^{(1)}$Determined according to ASTM D 1646-63, using a small sized rotor.
$^{(2)}$ Determined according to ASTM D 412-62 T on 2mm. thick test pieces.
$^{(3)}$ Determined according to ASTM D 1415-68 on 6mm. thick test pieces, reading after 30 seconds.
$^{(4)}$ Determined according to ASTM D 395-61 - method B.

From an examination of the data reported in Table a, it is apparent that blends 1 and 2, which do not contain the phosphorus complexes according to the present invention, do not vulcanize while the other compositions (blends 3 to 6) all lead to vulcanized bodies of satisfactory physical-mechanical characteristics and of good thermal resistance characteristics. More particularly, it will be noticed that vulcanization of blend 4 results in the formation of vulcanized bodies with the lowest values of compression-set, at acceptable rates of vulcanization.

in the vulcanizable composition.

Proceeding in the manner described in Examples 1-6, five blends are prepared which are then subjected for 10 minutes to vulcanization at 180° C. under pressure, and thereafter submitted to post-vulcanization at 250° C. for 16 hours in an air circulation furnace, with gradual rise of the temperature from 100° C. to 250° C. in a 5 hour period.

Table B summarizes the data respecting the compositions of the various blends and the properties of the vulcanizates thereof:

TABLE B

Vulcanizaton of Vinylidene Fluoride-Hexafluoropropene Elastomer With Cobalt-Phosphorus Complex

| Components of the blend (parts by weight) | Examples | | | | |
|---|---|---|---|---|---|
| | 7 | 8 | 9 | 10 | 11 |
| Tecnoflon NM | 100 | 100 | 100 | 100 | 100 |
| Magnesium oxide | 3 | 3 | 3 | 3 | 3 |
| Carbon black MT | 30 | 30 | 30 | 30 | 30 |
| Ca(OH)$_2$ | 7 | 7 | 7 | 7 | 7 |
| Hydroquinone | 1.8 | — | — | — | — |
| Mono-K-2-4-dihydroxybenzophenone (*) | — | 2.2 | — | — | — |
| Mono-K-bisphenol AF | — | — | 1.7 | 1.7 | 2 |
| C$_3$ Complex | 1.5 | 0.75 | 0.6 | 1 | 1.5 |
| Properties of Vulcanizate: | | | | | |
| O.D.R. 180° C. (1) torque: inch.lbs. | | | | | |
| minutes 2.5 | 9 | 11 | 16 | 18 | 21 |
| minutes 5 | 13 | 27 | 33 | 41 | 64 |
| minutes 7.5 | 17 | 58 | 48 | 59 | 88 |
| minutes 10 | 25 | 67 | 61 | 78 | 101 |
| minutes 15 | 38 | 81 | 83 | 95 | 115 |
| minutes 20 | 43 | 95 | 98 | 110 | 120 |
| minutes 30 | 47 | 98 | 108 | 111 | 122 |
| Viscosity: | | | | | |
| Mooney MS at 121° C.-minimum minutes for a 10 point increase | | | | | |
| Vulcanization: | | | | | |
| in a press at 180° C. for 10 minutes | | | | | |
| in an oven at 250° C. for 16 hours | | | | | |
| Modulus at 100% elongation, kg./sq.cm. | 15 | 37 | 45 | 50 | 85 |
| Tensile strength, kg./sq.cm. | 125 | 120 | 165 | 145 | 135 |
| Elongation at break, % | 410 | 195 | 215 | 185 | 140 |
| IRHD hardness | 66 | 69 | 71 | 73 | 75 |
| Compression-set, (method B) O-Rings (φ 25.4 × 3.53 mm.) | | | | | |
| 200° C. × 70 hours | 38 | 30 | 23 | 22 | 26 |
| 200° C. × 168 hours | 51 | 43 | 38 | 36 | 41 |

(1) According to ASTM D 2705-68 T using an oscillating disc rheometer.
*Monopotassium salt of 2-4-dihydroxybenzophenone.

From the data reported in Table B it may be seen that the use, according to the present invention, of the C$_3$ complex in combination with various polyhydroxy aromatic compounds facilitates the formation of vulcanized bodies having excellent mechanical characteristics and good compression-set values. More particularly, as far as the vulcanization rate is concerned, it is apparent that monopotassium salts of bisphenol AF or 2-4 dihydroxybenzophenone, in combination with the phosphorus C$_3$ complex, provide results superior to those obtained when hydroquinone is utilized as the vulcanizing agent.

EXAMPLES 12-13

Employing the methods described by J. Chatt and F. G. Mann in J.Chem.Soc., (1939), 1631, and in British Pat. No. 1,178,812 (1967), the following two phosphorus complexes (C$_4$ and C$_5$) are prepared:

C$_4$: PdCl$_2$ . 2P(C$_6$H$_5$)$_3$
[dichlorobis(triphenylphosphine)palladium (III)]

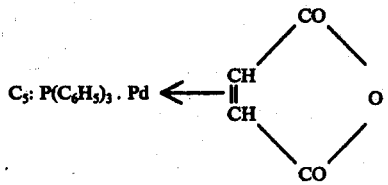

[bis[triphenylphosphine(maleic anhydride)]palladium (0)].

These complexes are used as components of vulcanizable compositions of a type analogous to those of Examples 7-11, in which use is made of 4,4'-dihydroxydiphenylmethane (with complex C$_4$) and of a monopotassium salt of bisphenol AF (with complex C$_5$) as vulcanizing agents (Examples 12 and 13, respectively).

Proceeding as described in Examples 1-6, 2 blends are prepared which are subsequently subjected to vulcanization for 12 minutes at 185° C. under pressure, and then subjected to a post-vulcanization at 240° C. for 16 hours, in an air flow furnace, with gradual rise of the temperature from 100° C. to 240° C. in 5 hours.

In Table C, the data relative to the qualitative-quantitative compositions of the blends and to the characteristics of the vulcanized products obtained therefrom are recorded:

TABLE C

Vulcanization of Vinylidene Fluoride-Hexafluoropropene Elastomer With Palladium-Phosphorus Complexes

| Components of the blend (parts by weight) | Examples | |
|---|---|---|
| | 12 | 13 |
| Tecnoflon NM | 100 | 100 |
| MgO (Maglite D) | 5 | 5 |
| Carbon black MT | 25 | 25 |
| Ca(OH)$_2$ | 5 | 5 |
| Vulcanizing agent | 2.3 | 1.85 |
| Complex C$_4$ | 1.3 | — |
| Complex C$_5$ | — | 0.9 |
| Properties of Vulcanizate | | |
| Viscosity: | | |
| Mooney MS, at 121° C. (1) | | |
| minimum | 46 | 43 |
| minutes for a 10 point increase | 48 | 27 |
| Modulus at a 100% elongations, kg./sq.cm. (2) | 21 | 63 |
| Tensile strength, kg./sq.cm (2) | 105 | 158 |
| Elongation at break, % (2) | 405 | 235 |
| Hardness IRHD (3) | 64 | 69 |
| Compression-set, O-Rings (φ 25.4 mm. × 3.53 mm.) | | |
| 200° C. for 70 hours (4) | 33 | 19.5 |
| 200° C. for 168 hours (4) | 45 | 31 |

(1) Determined according to ASTM D 1646-63, using a small sized rotor.
(2) Determined according to ASTM D 412-62 T on 2 mm. thick test pieces.
(3) Determined according to ASTM D 1415-68 on 6 mm. thick test pieces, reading after 30 seconds.
(4) Determined according to ASTM D 395-61 - method B.

From the data reported in Table C it may be seen that use of the palladium complexes with triphenylphosphine effects the formation of vulcanized bodies with excellent properties, with a vulcanization rate which is satisfactory and which is particularly high in the case of Example 13.

EXAMPLES 14-18

Phosphorus complexes C$_6$ and C$_7$ are prepared in the following manner:

0.1 mole of dichlorobis(triphenylphosphine)nickel (II) in 200 cc. of diethyleneglycol-monobutylether are heated with agitation for 3 hours at 180° C., together with 0.1 mole of butyl bromide (for complex C$_6$), or with benzyl bromide (for complex C$_7$). After cooling, the mixture is filtered and then washed with ethyl ether, thereby obtaining, respectively:

C$_6$: [NiCl$_2$.2P(C$_6$H$_5$)$_3$]. (C$_4$H$_9$Br)
C$_7$: [NiCl$_2$.2P(C$_6$H$_5$)$_3$]. (C$_6$H$_5$CH$_2$Br)

These complexes are used as components of vulcanizable compositions of elastomeric copolymers of vinylidene fluoride, in which various polyhydroxy-aromatic compounds, and more particularly, the following materials, are utilized as vulcanizing agents:

| Example | |
|---|---|
| 14 | monopotassium salt of 2,4,4'-trihydroxybenzophenone (with C$_6$); |

-continued

| Example | |
|---|---|
| 15 | 4,4'dihydroxybenzophenone (with C$_6$); |
| 16 | monopotassium salt of 1,5-naphthalenedithiol (with C$_6$); |
| 17 | monopotassium salt of bisphenol AF (with C$_7$); |
| 18 | monopotassium salt of |

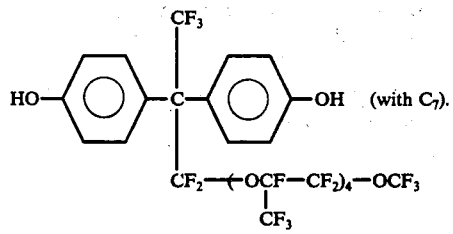 (with C$_7$).

Proceeding as described in Examples 1–6, 5 blends are prepared which are then subjected to vulcanization at 180° C. for 9 minutes and subsequently to post-vulcanization at 260° C. for 24 hours, with a gradual rise of temperature from 100° C. to 260° C. in 5 hours.

The blend composition data and vulcanizate property data is summarized below:

TABLE D
Vulcanization of Vinylidene Fluoride-Hexafluoropropene Elastomer With Nickel-Phosphorus Complexes

| Components of the blend (parts by weight) | Examples | | | | |
|---|---|---|---|---|---|
| | 14 | 15 | 16 | 17 | 18 |
| Tecnoflon NM | 100 | 100 | 100 | 100 | 100 |
| MgO (Maglite D) | 8 | 8 | 8 | 8 | 8 |
| Carbon black MT | 35 | 35 | 35 | 35 | 35 |
| Ca(OH)$_2$ | 10 | 10 | 10 | 10 | 10 |
| Vulcanizing agent | 1.9 | 2 | 3.2 | 1.9 | 3.6 |
| Phosphorus complex | 0.75 | 1.6 | 1 | 0.65 | 1.2 |
| Vulcanization: 180° C. for 9 minutes | | | | | |
| Post-vulcanizaton: 260° C. for 24 hours | | | | | |
| Properties of Vulcanizate | | | | | |
| Viscosity: | | | | | |
| Mooney MS, at 121° C. [1] | | | | | |
| minimum | 39 | 30 | 41 | 38 | 42 |
| minutes for a 10 point increase | 38 | 52 | 46 | 41 | 50 |
| Modulus at 100% elongation, kg./sq.cm. [2] | 61 | 26 | 25 | 58 | 85 |
| Tensile strength, kg./sq.cm [2] | 130 | 110 | 125 | 165 | 140 |
| Elongation at break, % [2] | 190 | 260 | 380 | 215 | 155 |
| Hardness IRHD [3] | 79 | 78 | 77 | 80 | 84 |
| Compression-set, O-Rings ($\phi$ 25.4 mm. × 3.53 mm.) | | | | | |
| 200° C. for 70 hours [4] | 29 | 32 | 30 | 21 | 23 |
| 200° C. for 168 hours [4] | 40 | 50 | 46 | 30 | 34 |

[1] Determined according to ASTM D 1646-63, using a small sized rotor.
[2] Determined according to ASTM D 412-62 T on 2 mm. thick test pieces.
[3] Determined according to ASTM D 1415-68 on 6 mm. thick test pieces, reading made after 30 seconds.
[4] Determined according to ASTM D 395-61 - method B.

From the data reported in Table D, it will be seen that the above-indicated phosphorus complexes, in combination with various polyhydroxy-aromatic and polythio-aromatic compounds of Formula II above, may be utilized to form vulcanized bodies having excellent characteristics, more particularly, with excellent compression-set values and with quite satisfactory vulcanization rates.

EXAMPLES 19–28

Phosphorus complexes C$_8$, C$_9$, C$_{10}$ and C$_{11}$ are prepared as follows:

0.1 mole of zinc chloride (C$_8$ and C$_9$ complexes) or 0.1 mole of cadmium chloride (C$_{10}$ and C$_{11}$ complexes) in 200 cc. of diethyleneglycol monobutylether is heated with stirring for 3 hours at 170°–180° C., together with 0.1 mole of benzyl chloride (C$_8$ and C$_{10}$ complexes) or 0.2 mole of benzyl chloride (C$_9$ and C$_{11}$ complexes). After cooling, the mixture is filtered and then washed with ethyl ether, thereby obtaining, respectively:

| | | |
|---|---|---|
| C$_8$: | ZnCl$_2$ . 2P(C$_6$H$_5$)$_3$ . C$_6$H$_5$CH$_2$Cl | M.P. 198° C. |
| C$_9$: | ZnCl$_2$ . 2P(C$_6$H$_5$)$_3$ . 2C$_6$H$_5$CH$_2$Cl | M.P. 221° C. |
| C$_{10}$: | CdCl$_2$ . 2P(C$_6$H$_5$)$_3$ . C$_6$H$_5$CH$_2$Cl | M.P. 199° C. |
| C$_{11}$: | CdCl$_2$ . 2P(C$_6$H$_5$)$_3$ . 2C$_6$H$_5$CH$_2$Cl | M.P. 205° C. |

These complexes are used as components of vulcanizable compositions based on elastomeric copolymers of vinylidene fluoride, and incorporating the following polyhydroxy compounds as vulcanizing agents:

| Example | |
|---|---|
| 19 | hydroquinone (with C$_8$ complex) |
| 20 | bisphenol AF (with C$_8$ complex) |
| 21 | bisphenol AF (with C$_{10}$ complex) |
| 22 | bis-para hydroxy phenyl sulfone (with C$_8$ complex) |
| 23 | bis-para hydroxy phenyl sulfone (with C$_{10}$ complex) |
| 24 | bisphenol A (with C$_9$ complex) (*) |
| 25 | bisphenol AF (with C$_9$ complex) |
| 26 | bisphenol Af (with C$_{11}$ complex) |
| 27 | bis-para hydroxy phenyl sulfone (with C$_9$ complex) |
| 28 | bis-para hydroxy phenyl sulfone (with C$_{11}$ complex) |

(*) isopropyliden-bis-(4-hydroxybenzene).

The composition of the several blends, conditions of vulcanization and properties of the vulcanizates produced therefrom, are set out in Table E. As is evident from the recorded results, from these compositions it is possible to obtain vulcanized bodies having good physical, mechanical and thermal properties, and to do so at acceptable vulcanization rates.

TABLE E
Vulcanization of Vinylidene Fluoride-Hexafluoropropene Elastomer With Zinc-and Cadmium-Phosphorus Complexes

| Components of the blend (parts by weight) | Examples | | | | | | | | | |
|---|---|---|---|---|---|---|---|---|---|---|
| | 19 | 20 | 21 | 22 | 23 | 24 | 25 | 26 | 27 | 28 |
| Tecnoflon NM | 100 | 100 | 100 | 100 | 100 | 100 | 100 | 100 | 100 | 100 |
| Magnesium oxide | 5 | 5 | 5 | 5 | 5 | 5 | 5 | 5 | 5 | 5 |
| Carbon black MT | 25 | 25 | 25 | 25 | 25 | 25 | 25 | 25 | 25 | 25 |
| Ca(OH)$_2$ | 5 | 5 | 5 | 5 | 5 | 5 | 5 | 5 | 5 | 5 |
| Vulcanizing agent | 2.5 | 2 | 1.8 | 2.2 | 2 | 2 | 1.75 | 1.8 | 2 | 2.5 |
| Phosphorus complex | 1.35 | 1.2 | 1.1 | 1 | 0.9 | 0.9 | 0.8 | 0.7 | 1 | 0.9 |
| Properties of Vulcanizate: | | | | | | | | | | |
| O.D.R. 180° C. [1] | | | | | | | | | | |
| Minimum torque inch.lbs. | 25 | 19 | 17 | 20 | 22 | 21 | 23 | 20 | 18 | 23 |
| T 50 minutes | 8.5 | 5.5 | 4.8 | 6 | 5.5 | 8.5 | 4.4 | 6.5 | 9 | 6 |
| T 90 minutes | 16 | 8 | 7 | 8 | 95 | 17 | 6 | 9 | 16 | 11 |
| Maximum torque inch.lbs. | 90 | 117 | 120 | 112 | 98 | 89 | 120 | 98 | 85 | 105 |
| Viscosity: | | | | | | | | | | |
| Mooney MS at 121° C. | | | | | | | | | | |
| minumum | 63 | 50 | 48 | 46 | 51 | 61 | 53 | 55 | 48 | 46 |
| minutes for a 10 point increase | 3 points after 60' | 55 | 51 | 45 | 38 | 45 | 50 | 38 | 52 | 54 |

TABLE E-continued
Vulcanization of Vinylidene Fluoride-Hexafluoropropene Elastomer With Zinc-and Cadmium-Phosphorus Complexes

| Components of the blend (parts by weight) | 19 | 20 | 21 | 22 | 23 | 24 | 25 | 26 | 27 | 28 |
|---|---|---|---|---|---|---|---|---|---|---|
| Vulcanization: | | | | | | | | | | |
| in a press at 180° C. for 10 minutes | | | | | | | | | | |
| in an oven at 250° C. for 16 hours | | | | | | | | | | |
| Modulus at 100% elongation, kg./sq.cm. | 85 | 70 | 65 | 75 | 60 | 105 | 70 | 60 | 55 | 85 |
| Tensile strength, kg./sq.cm. | 145 | 165 | 150 | 180 | 170 | 135 | 170 | 165 | 140 | 160 |
| Elongation at break, % | 165 | 205 | 215 | 200 | 190 | 155 | 200 | 230 | 255 | 185 |
| Hardness IRHD | 74 | 71 | 69 | 70 | 70 | 76 | 69 | 70 | 68 | 70 |
| Compression-set, (method B) | | | | | | | | | | |
| O-Rings ($\phi$ 25.4 × 3.53 mm.) | | | | | | | | | | |
| 200° C. × 70 hours | 25 | 19 | 18 | 20 | 21 | 24 | 16 | 18 | 23 | 19 |
| 200° C. × 168 hours | 39 | 28 | 26 | 31 | 33 | 39 | 28 | 31 | 35 | 32 |
| Thermal Resistance | | | | | | | | | | |
| Heat aging at 275° C. × 70 hours | | | | | | | | | | |
| Variation of modulus, % | +12 | 0 | −3 | 0 | 0 | +13 | −3 | 0 | +4 | 12 |
| Variation of tensile strength, % | −20 | −18 | −16 | −12 | −13 | −26 | −11 | −16 | −18 | −22 |
| Variation of elongation at break, % | −16 | +11 | +7 | +3 | +7 | −12 | +7 | +3 | 0 | −4 |
| Variation of hardness, points | +3 | 0 | 0 | 0 | 0 | +3 | 0 | 0 | +1 | +1 | d[(1)] According to ASTM D 2705-68 T using an oscillating disc rheometer

Adhesion of the Vulcanizates of the Invention to Metals

The following data demonstrates that the vulcanizable compositions of this invention, after vulcanization, provide excellent adhesion between the fluorinated elastomer and metals.

One of the most important uses of fluorinated elastomers is in sealing gaskets, both for static and dynamic applications. For such applications it is particularly important that the oil retainer or sealing ring (comprising the fluorinated polymer) form a tight seal with the revolving shaft. It is thus essential that the fluoropolymer gasket or other sealing member strongly adhere to the metallic shaft even at high temperatures (200°–250° C.).

In the following tests the adhesion values on metal (ASTM D 429-68 — method B — 90 Deg-stripping test) of various of the vulcanizable compositions described hereinabove are determined, employing Chemosil 510 (trade mark of Henkel & Co. GmbH as the adhesive. In Table F below the adhesive forces, determined by means of an AMSLER dynamometer with pulling speed of 500 mm./ minute, are given for the various compositions tested:

TABLE F
Values of Adhesion Force (kg./cm.) Rubber/Metal (ASTM D 429-68 Method B - DEG 90) of Vulcanizable Compositions of the Invention

| Example | Vulcanization Conditions In Press 180° C.×12min. | Vulcanization Conditions In Oven 250° C.×24hrs. | Vulcanization Treatment Conditions 250° C.×7days |
|---|---|---|---|
| 3 [(1)] | 9 | 5.5 | 4 |
| 4 [(1)] | 12 | 7.5 | 5 |
| 9 [(1)] | 10.5 | 6 | 5.5 |
| 10 [(1)] | 14 | 8.5 | 6.5 |
| 13 [(1)] | 12.5 | 10 | 7 |
| 16 [(1)] | 13.5 | 11 | 7.5 |
| 17 [(1)] | 9.5 | 6.5 | 4 |
| Control A [(2)] | 4.5 [(3)] | —[(4)] | —[(4)] |
| Control B [(3)] | 5 [(3)] | 2 [(3)] | —[(4)] |

[(1)] The values recorded in the tests of these materials must not be considered as "actual" values inasmuch as they do not refer to "net breakaway or ungluing" phenomena, but to ripping and breaking phenomena of the elastomeric element. This explains the fact that the adhesion value decreases when passing from the vulcanization under pressure at 180° C. to that in an oven at 250° C., up to the 7-day thermal treatment at 250° C. This is the case since brittleness of the fluorinated elastomer is directly proportional to the vulcanization degree attained which, in turn, depends directly on the vulcanization temperature and treatment time.

[(2)] The Control Formulations A and B have the following compositions, in parts by weight:

| | Control A | Control B |
|---|---|---|
| Tecnoflon NM | 100 | 100 |
| Mg(OH)$_2$ (Maglite D) | 3 | 3 |
| Ca(OH)$_2$ | 6 | 6 |

TABLE F-continued
Values of Adhesion Force (kg./cm.) Rubber/Metal (ASTM D 429-68 Method B - DEG 90) of Vulcanizable Compositions of the Invention

| Example | Vulcanization Conditions In Press 180° C.×12min. | Vulcanization Conditions In Oven 250° C.×24hrs. | Vulcanization Treatment Conditions 250° C.×7days |
|---|---|---|---|
| Carbon Black MT | | 30 | 30 |
| Bisphenol AF | | 1.8 | 1.8 |
| Phosphonium salt (Triphenyl benzyl phosphonium chloride) | | 1 | — |
| Phosphorane (Ethoxy carbonyl methylene triphenyl phosphorane: $C_2H_5O-CO-CH=P\,(C_6H_5)_3$) | | — | 0.5 |

[(3)] The values recorded for the control tests, as distinguished from the tests of the materials of the invention, are actual values in the sense that they are concerned with the peeling of the vulcanized elastomer from the metallic substrate without disruption of the elastomer.
[(4)] No adhesion found.

From the data reported by Table F, it will be seen that in all cases excellent adhesion values are obtained, whether after vulcanization in a press (at 180° C. × 12 min.), in an oven (at 250° C. × 24 hrs.), or after severe thermal treatment (at 250° C. for 7 days). In other words, the vulcanized products according to this invention are also characterized by high adhesion to metals even after prolonged and severe thermal treatment.

This latter characteristic becomes particularly important when it is recognized that not all the vulcanizing systems suggested by the prior art are not capable of producing vulcanized bodies having entirely satisfactory adhesion to metals, especially after severe thermal treatment.

It will be understood that various modifications may be made in the preferred embodiments described hereinabove without departing from the scope of the invention. Accordingly, the preceding should be construed as illustrative only and not in a limiting sense.

Having thus described our invention, what we desire to secure by Letters Patent and hereby claim is:

1. Vulcanizable compositions comprising:
    1. 100 parts by weight of an elastomeric copolymer of (a) vinylidene fluoride, and (b) at least one fluorinated or chloro-fluorinated ethylenically unsaturated monomer selected from 1-hydropentafluoropropene, 2-hydropentafluoropropene, 1,1-dihydrotetrafluoropropene, hexafluoropropene, tetrafluoroethylene, trifluorochloroethylene, and fluorinated alkyl and aryl vinyl ethers;
2. 1–40 parts by weight of an inorganic acid acceptor selected from magnesium oxide, calcium oxide, lead monoxide, zinc oxide and basic lead phosphite as such or in the form of a complex or cationic chelate;
3. 0.5–10 parts by weight of at least one basic compound selected from calcium, strontium or barium hydrate, the alkali metal or alkaline earth metal salts of weak acids as such or in the form of complexes with chelating agents or cationic complexants;
4. 0.5–15 parts by weight of a vulcanizing agent selected from polyhydroxy and polythiol compounds of the formulae:

wherein
A is an arylene radical;
n is a whole number equal to or greater than 2;
B is oxygen or sulfur;
C is hydrogen, an alkali metal or an alkaline earth metal; R is an organic radical selected from the group consisting of alkylene, cycloalkylene, mono- or polyalkylenecycloalkyl, alkylenediaryl, bis-aryl sulfone, bis-arylsulfide, bis-aryl ether and bis-aryl ketone; and
5. 0.1–5 parts by weight of at least one phosphorus complex of the formulae:

wherein
M is an element or oxygen containing group capable of forming coordination complexes with phosphorus and capable of yielding cations with a valence $m$ of of from 1 to 4 and being selected from the group consisting of Cu, Hg, Zn, Cd, Fe, Co, Ni, Pd, $VO^{+2}$ and $TiO^{+2}$;
$a$, $b$ and $c$ are whole numbers of from 1 to 4;
$R_1$, $R_2$, $R_3$ and $R_4$ are the same or different and are selected from hydrogen, alkyl, aralkyl, alkylaryl, cycloalkyl, aryl, oxyalkyl, carbomethoxy alkyl or linear or cyclic polyoxyalkyl radicals with the hydroxyl group either free or etherified, or alkyl, cycloalkyl, aralkyl, alkylaryl, oxyalkyl, or linear or cyclic polyoxyalkyl radicals substituted by halogen groups;
$R_1$, $R_2$ and $R_3$ may also be selected from alkoxyl, cycloalkoxyl, aryloxyl, or alkylenearyloxyl radicals;
$R_1$, $R_2$, $R_3$ and $R_4$ when not hydrogen, have from 1 to 18 carbon atoms; and X and Y are organic and inorganic monovalent anions independently selected from the group consisting of halides, perchlorates, nitrates, acetates, haloacetates and benzoates.

2. The vulcanizable compositions of claim 1, which comprise, per 100 parts by weight of said elastomeric vinylidene fluoride copolymer ingredient (1), from 2–10 parts by weight of said inorganic acid acceptor ingredient (2), from 3–7 parts by weight of said basic compound ingredient (3), from 1–6 parts by weight of said vulcanizing agent ingredient (4), and from 0.1–2 parts by weight of said phosphorus complex ingredient (5).

3. The vulcanizable compositions of claim 1, wherein said vulcanizing agent ingredient (4) is selected from hydroquinone, resorcinol, catechol, naphthols, polyhydroxybenzophenones, bis-hydroxyaryl sulfones, bis-phenols; hydroquinone, resorcinol, catechol, naphthols, polyhydroxybenzophenone and bisphenols substituted by halogen; lower aliphatic and cyclo-aliphatic diols; dialkylenecycloaliphatic diols; dialkylenearomatic diols, thiols of the preceding compounds; and alkali metal or alkaline earth metal salt thereof.

4. The vulcanizable compositions of claim 1, wherein
$a$ is 1;
$b$ is 2 or 4;
$c$ is 1 or 2;
X and Y are independently selected from the group consisting of halide, perchlorate or halo acetate;
$R_1$, $R_2$ and $R_3$ are each the same and are phenyl, halophenyl or p-trifluoromethylphenyl

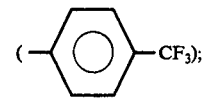

or
$R_1$ and $R_2$ are the same and are phenyl or lower alkyl, and $R_3$ is polyoxyalkylene, $-CF_3$ or phenyl; and
$R_4$ is alkyl or aralkyl and, $R_1$, $R_2$ and $R_3$ are the same and are each phenyl.

5. Vulcanized compositions obtained by heating the vulcanizable compositions of claim 1, initially under pressure and at temperatures of from 130° to 200° C. for a period of from 0.5 to 60 minutes, and thereafter at atmospheric pressure and at temperatures of from 130° to 315° C. for a period of from 5 to 48 hours.

6. Vulcanized compositions obtained by heating the vulcanizable compositions of claim 1, initially under pressure and at temperatures of from 160° to 200° C. for a period of from 1 to 20 minutes, and thereafter at atmospheric pressure and at temperatures of from 200° to 275° C. for a period of from 10 to 24 hours.

* * * * *

UNITED STATES PATENT OFFICE
CERTIFICATE OF CORRECTION

Patent No. 4,062,830   Dated December 13, 1977

Inventor(s) Giovanni Ceccato et al

It is certified that error appears in the above-identified patent and that said Letters Patent are hereby corrected as shown below:

Title page, left side, the Title: The title should read -- VULCANIZABLE COMPOSITIONS BASED ON ELASTOMERIC COPOLYMERS OF VINYLIDENE FLUORIDE, PROCESS FOR VULCANIZATION THEREOF AND VULCANIZED COMPOSITIONS OBTAINED THEREBY --.

Column 1, the title should read: -- VULCANIZABLE COMPOSITIONS BASED ON ELASTOMERIC COPOLYMERS OF VINYLIDENE FLUORIDE, PROCESS FOR VULCANIZATION THEREOF AND VULCANIZED COMPOSITIONS OBTAINED THEREBY --.

Column 4, lines 47-48: "9. dichlorobis(dimethyltrifluoromethyl-phosphine)-nickel (II), $NiCl_2 \cdot 2[P(CH_3)_2CF];$" should read -- 9. dichlorobis(dimethyltrifluoromethylphosphine)-nickel (II), $NiCl_2 \cdot 2[P(CH_3)_2CF_3];$ --.

Column 5, line 25: "25. $[NiBr_2 \cdot \cdot 2P(C_6H_5)_3] \cdot (C_4H_9Br)$" should read -- $[NiBr_2 \cdot 2P(C_6H_5)_3] \cdot (C_4H_9Br)$ --; line 44 (footnote): "colorimeter" should read -- calorimeter --.

Column 6, line 32: "vulcanization canization" should read -- vulcanization --.

Column 7, line 58: "Table a" should read -- Table A --.

Column 8, line 13: "thier" should read -- their --; line 15: "useful as" should read -- useful are --.

UNITED STATES PATENT OFFICE
CERTIFICATE OF CORRECTION

Patent No. 4,062,830   Dated December 13, 1977

Inventor(s) Giovanni Ceccato et al

It is certified that error appears in the above-identified patent and that said Letters Patent are hereby corrected as shown below:

Column 9, lines 20-21, Table B:

"Viscosity:
Mooney MS at 121° C.-minimum
minutes for a 10 point increase                "    should read:

-- Viscosity:
Mooney MS at 121°C.-minimum         41   38   40   46   48   --.
minutes for a 10 point increase     60   35   31   25   21

Column 9, line 54: [dichlorobis(triphenylphosphine)palladium (III)]" should read -- [dichlorobis(triphenylphosphine)palladium (II)] --.

Column 15, line 40: "m of of from" should read -- m of from --.

Signed and Sealed this

Twenty-fifth Day of July 1978

[SEAL]

Attest:

RUTH C. MASON
Attesting Officer

DONALD W. BANNER
Commissioner of Patents and Trademarks